Sept. 22, 1942.  V. E. MATULAITIS  2,296,646
THROTTLE CONTROL
Filed Oct. 9, 1940  4 Sheets-Sheet 1
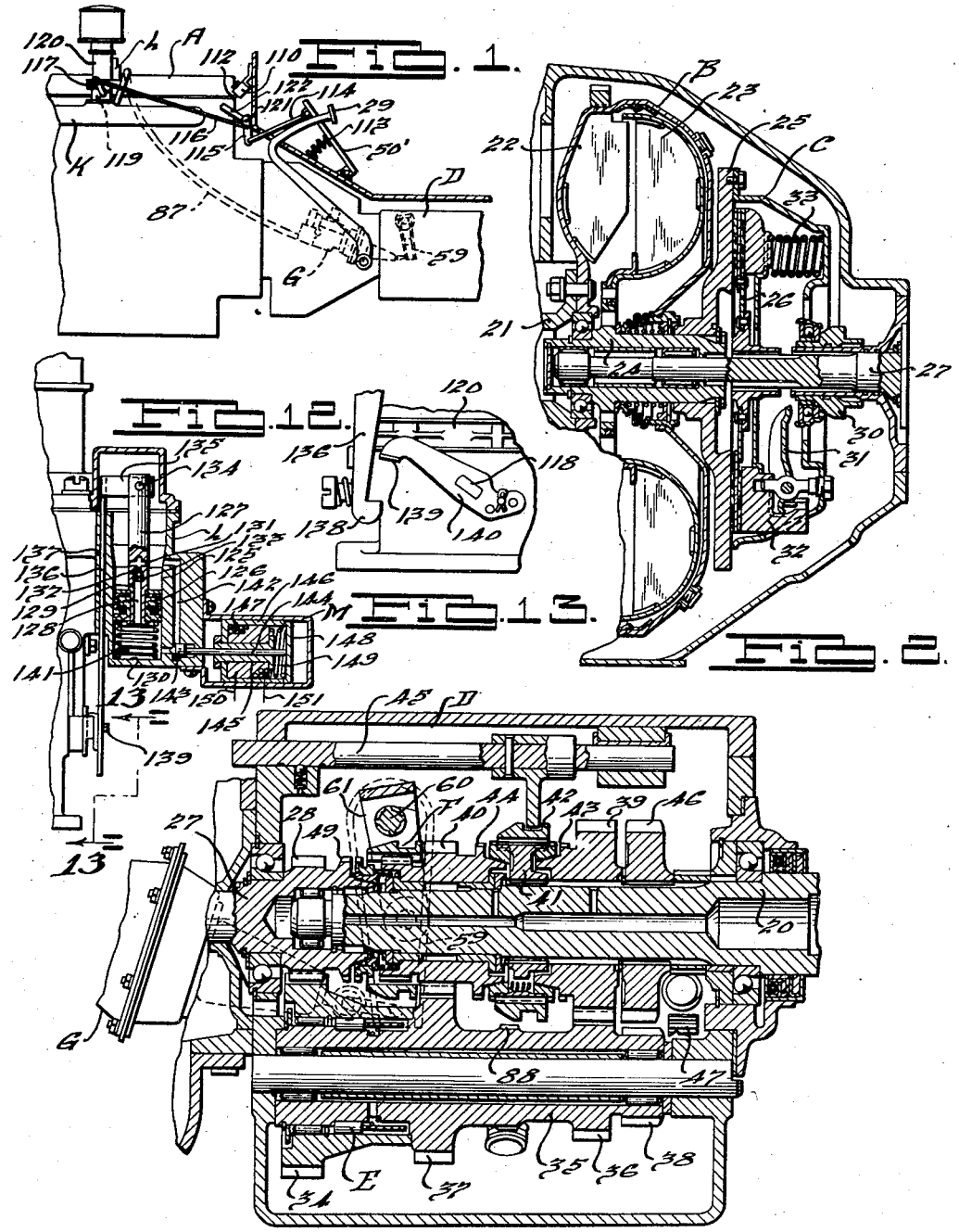
INVENTOR
Victor E. Matulaitis
BY
ATTORNEYS.

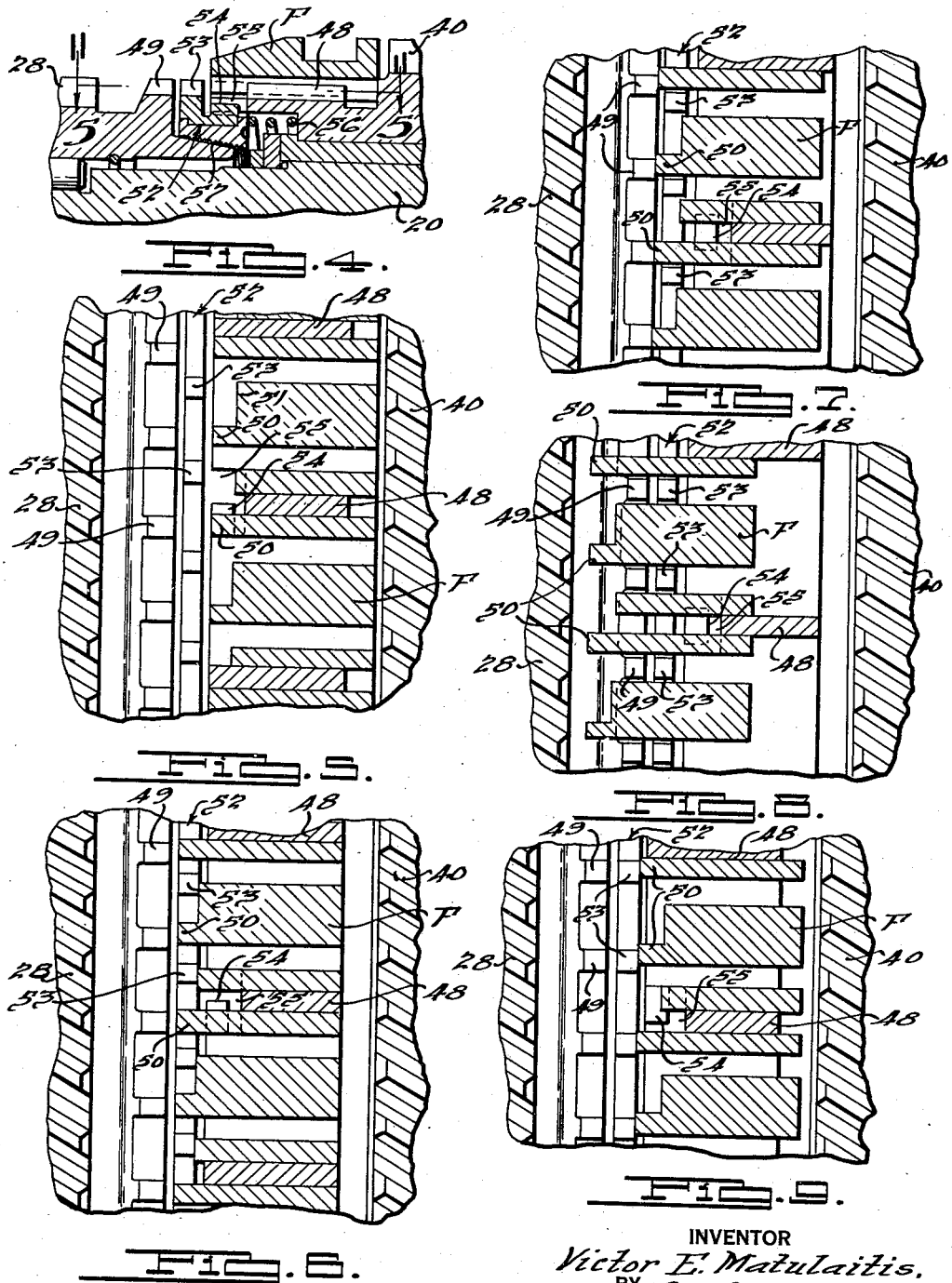

Sept. 22, 1942.  V. E. MATULAITIS  2,296,646
THROTTLE CONTROL
Filed Oct. 9, 1940  4 Sheets-Sheet 3
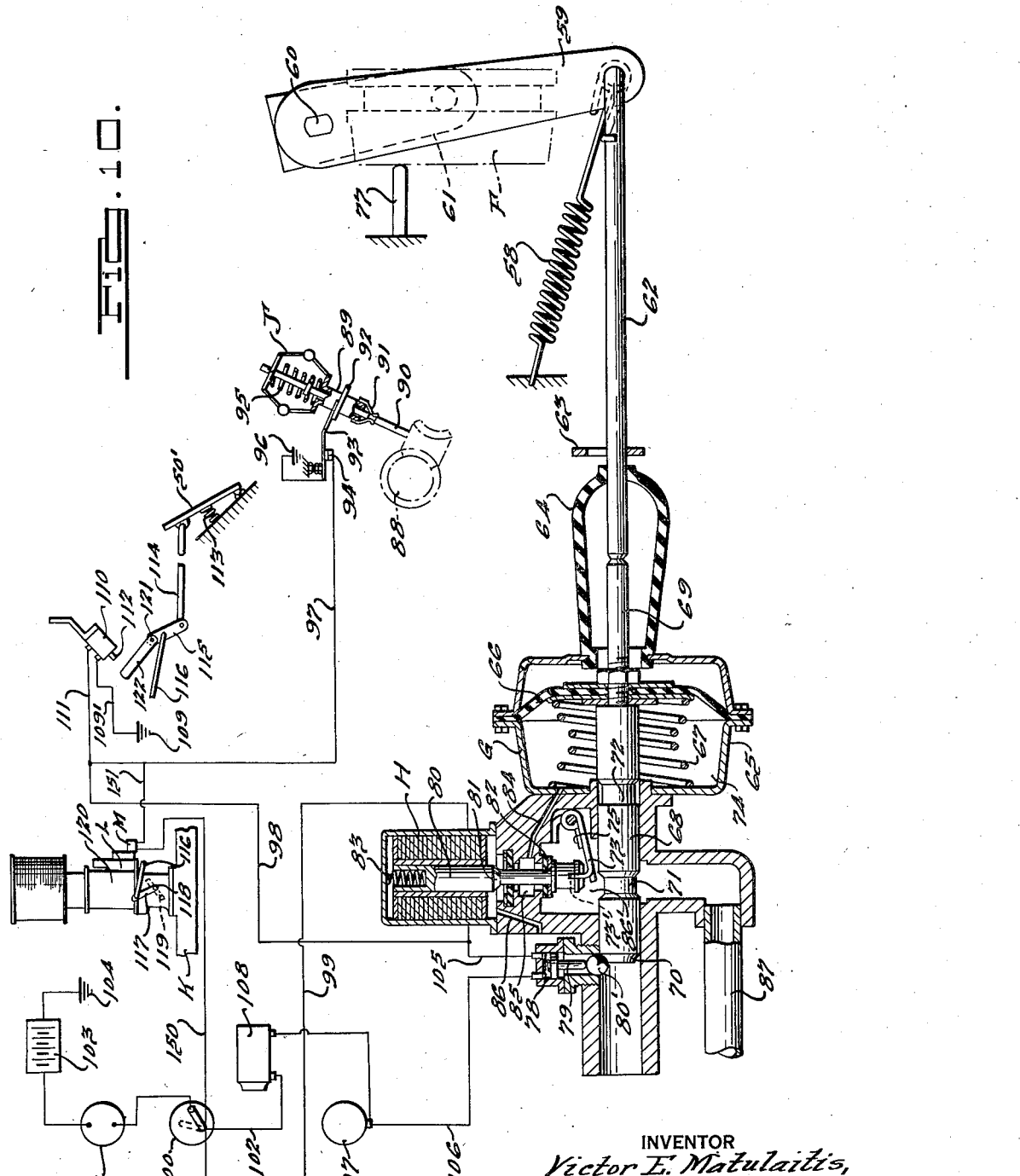
INVENTOR
Victor E. Matulaitis,
BY
ATTORNEYS.

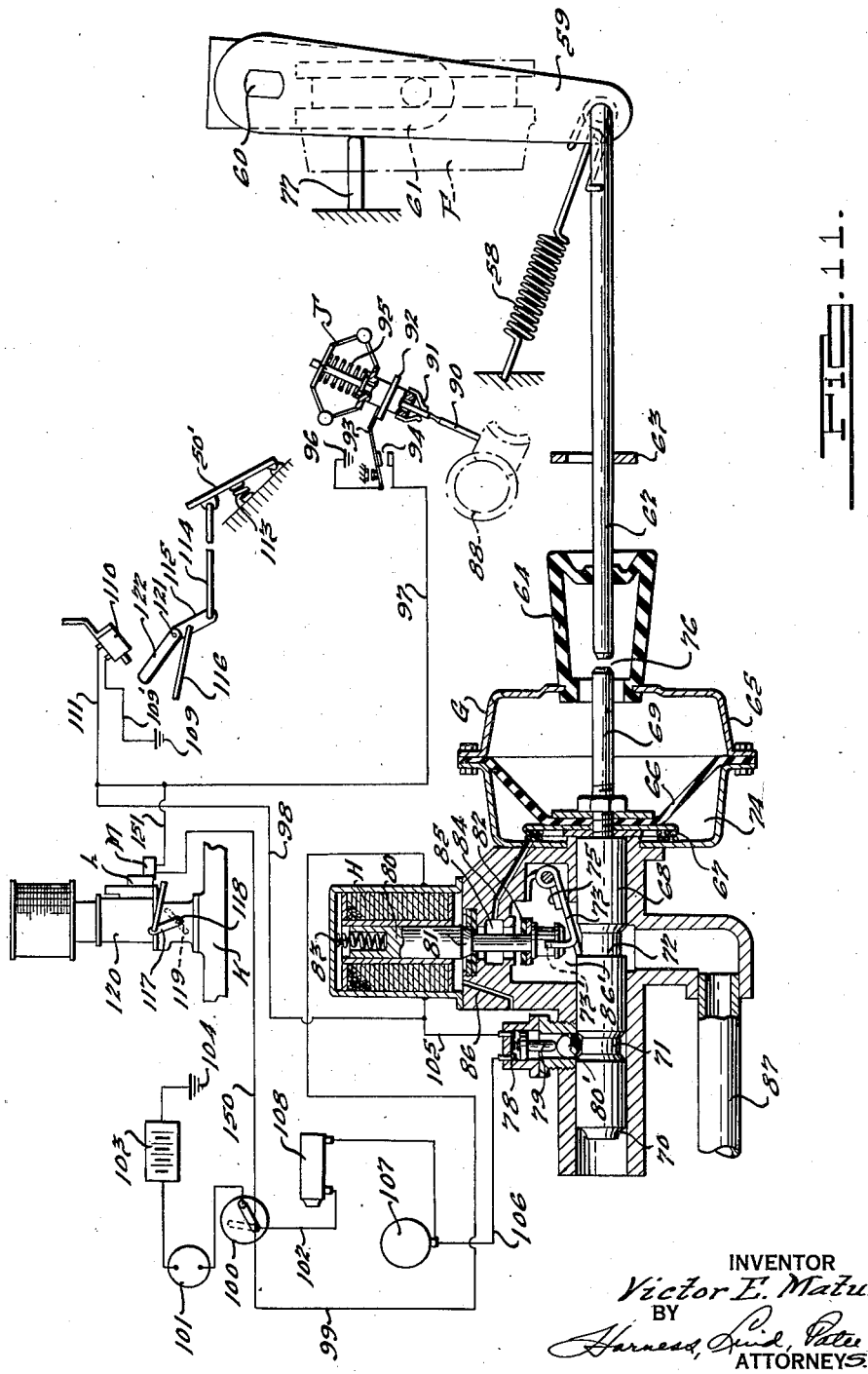

Patented Sept. 22, 1942

2,296,646

UNITED STATES PATENT OFFICE 2,296,646

THROTTLE CONTROL

Victor E. Matulaitis, Highland Park, Mich., assignor to Chrysler Corporation, Highland Park, Mich., a corporation of Delaware Application October 9, 1940, Serial No. 360,475

19 Claims. (Cl. 74—472)

This invention relates to throttle control devices especially in conjunction with motor vehicles.

It is well known at this time that internal combustion engines have a tendency to stall when, at low vehicle driving speeds, the driver suddenly releases the accelerator pedal to allow the throttle valve to suddenly close. This characteristic is especially pronounced in motor vehicles equipped with a fluid coupling through which the drive is taken. Not only does the fluid coupling allow the engine to stall even though the car is travelling at a low speed, by reason of the inherent slip in the fluid coupling, but the action of the fluid in the coupling incident to change from drive to coast when the driver releases the accelerator pedal accentuates the tendency for the engine to stall. At relatively high speeds the fluid coupling acts to prevent stalling of the engine and also at this time the engine does not tend to stall.

Heretofore, in motor vehicles equipped with fluid couplings, free-wheeling clutches, or other devices which release the engine from the car ground wheels when the accelerator pedal is released, or in vehicles without any release device wherein the engine stalling tendency at low speed is especially pronounced, such vehicles have been equipped with a dashpot or similar retarding device for controlling the last part of throttle closing movement independently of the accelerator pedal. Thus, while the accelerator pedal may be suddenly released, the throttle valve has its final closing movement retarded so that the fuel supply system and other factors which are disturbed and which give rise to engine stalling have an opportunity to become balanced or adjusted to the coast conditions whereupon the throttle valve is allowed to fully close.

The foregoing throttle retarding devices have the disadvantage that at relatively high speeds of the engine and car, the full effect of utilizing the engine as a brake, when the accelerator pedal is released, cannot be realized because the throttle valve does not immediately close and the engine does not immediately tend to drop to its idling speed corresponding to fully closed throttle. In cars equipped with free-wheeling devices, there is usually provided means for automatically rendering the free-wheel inoperative above a predetermined car speed as by automatically bringing a two-way drive into action so that the aforesaid engine braking is likewise not fully used in these driving systems when the throttle retarding device is employed.

There is also a further objection to the use of the throttle control devices commonly heretofore employed in conjunction with the aforesaid free-wheel systems and in conjunction with transmission systems incorporating a change speed, usually a step-up in the speed ratio drive, brought into action by releasing the accelerator pedal so as to allow the engine to coast down to synchronize the speeds of the drive control parts. In such systems the throttle control acts to increase the time for bringing the change speed into operation or for rendering the free-wheel inoperative because the engine drops its speed much more slowly than where the throttle control device is not employed.

It is an object of my invention to provide improved means, preferably automatically acting, for bringing the throttle control device into action at low speeds and for eliminating the throttle control device at higher speeds where it is not needed and where it is a detriment from the standpoints of engine braking, free-wheel elimination, speed ratio change incident to coast or any of these factors alone or together.

In driving systems employing what is known as a kick-down control on the transmission, whereby the driver by fully depressing the accelerator pedal causes a downshift or step-down in the driving ratio through the transmission, it is important to eliminate the dashpot action so that a rapid upshift or step-up in the transmission driving ratio is effected when the driver suddenly releases the accelerator pedal under conditions where this sudden release takes place at relatively high car and engine speeds. It is a further object of my invention to provide a throttle control so arranged that it will provide substantially instantaneous response to control functions calling for operation or elimination of the dashpot action, especially so that, in the instance of sudden release of the accelerator pedal from kick-down as aforesaid, the dashpot action will be ineffective to retard the throttle closing. This not only provides rapid transmission step-up but quickly couples the engine with the vehicle driving wheels so that full braking effect of the engine is available without undue delay.

In driving systems incorporating speed ratio change under speed responsive control, I preferably employ the same speed control for controlling the throttle retarding device, especially in those systems wherein the engine has a tendency to stall only at speeds below the speed of operation of the speed ratio change. If this is not convenient or desired, then a separate speed responsive control may be provided for the throttle retarding device.

Further objects and advantages of my invention will be more apparent from the following illustrative embodiment thereof, reference being had to the accompanying drawings in which:

Fig. 1 is a side elevational view showing a motor vehicle engine and power transmission equipped with my invention.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of my invention in conjunction with the control mechanism for the automatic clutching sleeve, the latter being shown in its released position.

Fig. 11 is a similar view in another operating position of certain of the parts.

Fig. 12 is a sectional elevational view showing the throttle retarding device and my control therefor.

Fig. 13 is a detail elevational view taken as indicated by line 13—13 of Fig. 12.

While my control may be employed in conjunction with various types and arrangements of mechanisms and devices, I have illustrated the principles of my invention in connection with a motor vehicle transmission of the type in which speed ratio change occurs in response to engine retardation. It is desirable to illustrate one such driving system in order to describe the functioning of my control, when used in conjunction with a transmission of this type, and to this end I have shown certain salient parts of the transmission system which is more fully described and claimed in the copending application of Carl A. Neracher et al., Serial No. 335,310, filed May 15, 1940.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the drive to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depresisng pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before; thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby closing the engine throttle valve and allowing the engine to coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning. First is a free-wheeling drive, by reason of overrunning clutch E, until sleeve F shifts forwardly accompanied by engine coast to bring about the aforesaid synchronous condition.

When driving in third, fourth or direct is obtained just as for second by driver release of the accelerator pedal and resulting shift of sleeve F to clutch with teeth 49 when these parts are synchronized by reason of the engine coasting down from the drive in third. Third is a free-wheeling drive, by reason of overrunning clutch E, until sleeve F shifts forwardly accompanied by engine coast to bring about the aforesaid synchronous condition. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of sleeve 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 and 11 there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a leader rod 68 which has a rear extension 69 aligned with rod 62.

Rod 68 has a series of detents 70, 71 and 72, the latter cooperating with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributor of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80' whenever rod 69 moves between the Fig. 10 and Fig. 11 positions by reason of the enlarged rod portion between detents 70, 71. Detent 71 is so arranged that, with the parts as in Fig. 11 and sleeve F clutch, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 76 then opening by detent 70 to restore the ignition system.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates, the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at appoximately 7 and 15 M. P. H. (miles per hour), the switch 94 closing on stopping the car in direct and second at approximately 7 and 3 M. P. H. respectively.

When switch 94 closes then the solenoid H is energized to vent chamber 74, a governor solenoid circuit being established from ground 96 through switch 94 and conductors 97, 98 to solenoid H thence by conductor 99 to ignition switch 100, ammeter 101, battery 103 and ground 104. In Fig. 10 the ignition switch is shown closed. When open, as indicated by the dotted line showing, then this circuit is opened.

The interrupter switch 78 is in series with switch 94 and also by another circuit with the kick-down switch to be presently described, a branch conductor 105 extending between conductor 98 and one terminal of switch 78, the other terminal being connected by a conductor 106 to the primary terminal of distributer 107 and coil 108 in such manner as to ground and render inoperative the engine ignition system by closing interrupter switch 78.

The engine ignition system, part of which is shown in Fig. 10, extends from battery 103 through the ignition switch 100 and thence by conductor 102 to the coil 108 and distributer 107.

Another electrical circuit, referred to as the kick-down solenoid circuit, is arranged, similar in some respects to the governor solenoid circuit, for controlling solenoid H so that when the engine throttle is approximately wide open the solenoid may be energized to release latch 73 thereby allowing spring 67 to take up gap 76 and, in succession, ground the engine ignition system, release sleeve F, restore the ignition system, and by reason of the open throttle cause the engine to quickly increase its speed to engage clutch E so as to drive the car in either first or third depending on whether the kick-down mechanism was operated while driving in second or fourth respectively. This kick-down solenoid circuit comprises a ground 109 thence by conductor 109' to the kick-down switch 110 thence by conductor 111 to conductor 98, the rest of this circuit being the same as the governor solenoid circuit through solenoid H, ignition switch 100, ammeter 101, battery 103 and ground 104.

The kick-down switch 110 is a push plunger self-releasing type of switch operated by push plunger 112. The accelerator pedal 50' is yieldingly urged to its throttle closing position by the usual spring 113, this pedal operating through link 114, lever 115, and link 116 to move the throttle valve lever 117 pivoted to shaft 118. Secured to this shaft is the usual throttle valve 119 which controls the mixture of air and gasoline at carburetor 120. The lever 115 is pivotally mounted at 121 and has fixed thereto a second lever 122 so arranged in relation to plunger 112 that when the accelerator pedal is fully depressed lever 122 engages plunger 112 and pushes the plunger thereby closing switch 110 and closing the kick-down solenoid circuit. When the accelerator pedal is released, plunger 112 follows the releasing movement of lever 122 thereby opening switch 110 and opening the kick-down solenoid circuit. Thus, opening and closing operations of switch 110 occur at the region of full throttle opening and full depression of the accelerator pedal.

In the operation of the mechanism as thus far described, the car at standstill and with ignition switch 100 closed will cause the solenoid H to be energized as in Fig. 10 because governor switch 94 is closed. Cylinder 74 is vented and sleeve F disengaged. The driver shifts sleeve 42 to either the high or low range and accelerates the car ordinarily above the critical speed of governor J causing switch 94 to open. As vacuum builds up in the engine intake manifold K, plunger 80 now being lowered because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired. If the driver releases the accelerator pedal at a car speed below that causing switch 94 to open, then the car will free-wheel in first under control of overrunning clutch E.

If the car is initially accelerated in first to a speed above the governor critical speed and the engine then allowed to coast, second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all stops and starts made without further shifting. This is possible owing to slippage in the fluid coupling when stopping the car for a traffic light and is practicable because the fluid coupling allows high engine torque for favorable car acceleration and because the governor J always directs a downshift by causing sleeve F to release on bringing the car to rest. Thus there is automatically provided a favorable torque-multiplying gearing for starting, as in third. Just as in first, the drive is free-wheeling in third below car speeds which otherwise would cause the governor switch 94 to open.

On bringing the car to a stop in fourth or second, the governor J will close switch 94 thereby energizing solenoid H and venting chamber 74 which causes spring 67 to thrust rods 68 and 62 rearwardly to release sleeve F as the car approaches a stop with attendant low torque at the teeth of sleeve F.

The sleeve F is also disengaged by a full depression of the accelerator pedal 50' at the will of the driver while governor switch 94 is open, this kick-down control being especially beneficial to enable the driver to quickly step-down the transmission ratio for more favorable torque drive as in passing a car on the road or in climbing a hill. The illustrated driver operable means is preferably arranged for control by depressing the accelerator pedal 50' all the way so that the step-down will occur as a natural result of manipulating the accelerator pedal for maximum power output. The pedal may either be arranged to provide this step-down as the engine throttle approaches its wide open position as illustrated or subsequently to the throttle reaching its wide open position by providing a mechanism, such as illustrated in the aforesaid Neracher et al., application, which allows the accelerator pedal to overtravel its throttle actuating range into a secondary range. Therefore, when the accelerator pedal is fully depressed, at times when switch 94 is open and the car is being driven in fourth or second, the kick-down switch 110 is closed and the kick-down solenoid circuit is thereby established causing momentary interruption of the ignition system accompanied by step-down in the transmission speed ratio as aforesaid to third or first as the case may be. When the driver releases the accelerator pedal, assuming switch 94 is still open at such time, sleeve F will restore the drive to fourth or second as the engine slows down to unblock sleeve F at a speed synchronizing teeth 49 with the teeth of sleeve F. This accelerator pedal release opens switch 110 thereby opening the kick-down solenoid circuit whereupon chamber 74 is opened to vacuum causing piston 66 to move to its latched position of Fig. 11, spring 58 acting to move sleeve F forwardly.

In the foregoing driving system, there is a tendency of the engine to stall at low speeds viz., at speeds when the governor switch 94 is closed, when the driver suddenly releases the accelerator pedal 50' to call for full throttle closing. This stalling tendency is aggravated by the presence of free-wheeling at clutch E under the conditions aforesaid and more particularly by reason of the use of the fluid coupling B. It is therefore advisable to incorporate in the system a dashpot control on the last part of the throttle closing movement such that this movement is retarded sufficiently so that a condition of equilibrium is reached in the fluid coupling and in the engine intake system whereupon the throttle is then fully closed for conventional engine idling without danger of stalling the engine.

However, when such a dashpot control is incorporated in the system, it acts to increase the time of engine retardation, compared to retardation time without the dashpot, so that synchronization of sleeve F with teeth 49 is undesirably delayed and the driver is compelled to wait an objectionable length of time for the step-up and free-wheeling elimination to occur. I have therefore provided novel means to automatically render the dashpot inoperative at times when there is no danger of engine stalling under the aforesaid conditions and in the illustrated transmission system I preferably employ the same governor J to control the dashpot action. Thus, as soon as governor J directs clutching of sleeve F the dashpot is put out of action thereby insuring rapid speed ratio step-up and free-wheeling elimination as soon as the accelerator pedal is released, this function taking place without any danger of engine stalling because sleeve F, on clutching, brings about a two-way drive whereby the car drives the engine through the fluid coupling and also because at such time the engine speed is sufficiently high so that ordinarily there will be no tendency for the engine to stall. Once the dashpot has been rendered inoperative, it preferably remains in this condition for all car speeds above those corresponding to opening of governor switch 94 but as soon as the governor switch closes as an incident to retardation of the car, then the dashpot control is rendered operative again. This will guard against engine stalling at low speeds of the engine and is not objectionable from other viewpoints because at such times it is not desired to engage clutch F as a function of engine retardation.

Referring particularly to Figs. 12 and 13, there is mounted on the carburetor 120 a dashpot L, preferably of the fluid type, having a cylinder 125 adapted to store a quantity of working fluid such as oil. Within this cylinder there is fitted a movable dashpot element in the form of a piston 126 carried by the lower end of a rod 127 which is provided with a main passage 128 freely open downwardly to the lower close chambered end 130 of cylinder 125. Adjacent the upper end of piston 126 there is a restricted vent passage 129 which controls the rate of downward travel of the piston. The fluid is stored above the piston and freely enters the dashpot working chamber 130 through passage 128 when the piston moves upwardly by reason of passage inlets 131 under control of a ball check valve 132. When the piston moves upwardly, the ball 132 moves downwardly on the spidered seat 133 and freely allows the fluid to enter inlets 131, whence the fluid flows past ball 132 and down passage 128 to chamber 130. When the piston moves downwardly, the fluid is forced up in passage 128 causing ball 132 to seat upwardly and thereby preventing escape of the fluid at inlets 131. The fluid must then escape at vent 129 which is of such capacity as to retard the downward stroke of the piston until the aforesaid condition of equilibrium is reached at which there is no danger of the engine stalling.

In the foregoing operation of the dashpot L it is assumed that the fluid has no escape other than through passage 128 but, as will presently be more apparent, I have provided means for venting the pressure chamber 130, this means comprising a by-pass around the piston so that at times the fluid may freely flow back and forth between the chamber 130 and the reservoir above the piston without appreciable restriction or retarding action.

In order to control the throttle valve by piston 126, rod 127 is connected at its upper end, as at 134, with the offset portion 135 of the reciprocatory lever 136 slidable in a guide 137 and having its lower end shouldered at 138 for engagement by the offset finger 139 of a lever 140 which is fixed to the aforesaid throttle-valve shaft 118 at the end opposite to that carrying lever 117. A spring 141 yieldingly acts to raise piston 126 so as to position shoulder 138 for engagement by finger 139 during the last portion of throttle valve closing. Thus when the accelerator pedal 50' is released, spring 113 quickly acts to nearly close the throttle valve whereupon finger 139 engages shoulder 138 and the remainder of the throttle-closing movement is under the delayed control of dashpot L. When the accelerator pedal is depressed, lever 140 swings clockwise as seen in Fig. 13 away from shoulder 138 so that the throttle valve opens without restriction from dashpot L, spring 141 then raising piston 126 and shoulder 138 into position ready to again retard the final closing movement of the throttle valve when the accelerator pedal is released.

I have provided a by-pass vent passage 142 between chamber 130 and the reservoir space above piston 126, this passage during the aforesaid operation of the dashpot L being closed against fluid flow therethrough by a valve 143. This valve is carried by a stem 144 slidable in a thimble 145 disposed centrally within a cup 146 containing the windings 147 of an electromagnet M. Cooperating with cup 146 so as to be attracted to the outer end thereof is an armature 148 which is fixed to the outer end of stem 144. A spring 149 yieldingly urges the armature 148 rearwardly so that when the electromagnet M is de-energized, the valve 143 will be moved outwardly to open the by-pass vent 142.

Whenever the electromagnet M is energized, as in Fig. 12, then dashpot 12 performs its function of retarding the last part of the throttle closing but when the electromagnet is de-energized then piston 126 is free to move downwardly as well as upwardly because of the ready flow of the fluid through the by-pass 142.

The retarding action of the dashpot takes place at engine speeds corresponding to car speeds sufficiently low to maintain the governor switch 94 closed and thereby energize the electromagnet M. When the governor J operates to open this switch then the dashpot L is rendered inoperative by de-energizing the electromagnet M. Under the latter condition, release of the accelerator pedal will bring about immediate and unrestricted movement of the throttle to its fully closed position thereby minimizing the time required for the engine to slow down to synchronize teeth 49 with sleeve F, as compared with the time required if the dashpot L delayed the last part of throttle-closing. This not only expedites the change speed functioning of transmission D and elimination of free-wheeling but also insures more efficient use of the engine as a brake whenever the accelerator pedal is released at speeds causing the governor switch 94 to open.

The governor dashpot circuit for controlling dashpot L is as follows. Ground 104 through battery 103 and ammeter 101 to ignition switch 100, thence by conductor 150 to the windings 147 of electromagnet M, then by conductors 151 and 97 to switch 94 and then to ground 96.

When the car is being driven at low speeds such that governor switch 94 is closed, then the governor dashpot circuit is established to energize electromagnet M and cause valve 143 to close off the by-pass vent 142 as in Figs. 10 and 12. This allows the dashpot L to act to retard the last part of throttle closing. When the car speed is such that governor J acts to open the governor switch 94, then the governor dashpot circuit is broken and spring 149 acts to move valve 143 outwardly to open the by-pass vent 142, the valve remaining in this position as long as the switch 94 remains open, unless the kickdown switch 110 is closed. With the valve 143 moved outwardly, the dashpot L is rendered ineffective to retard closing of the throttle as aforesaid but is again immediately brought into action in response to closing of switch 94 as soon as the car speed is sufficiently retarded. In the drawings, the accelerator pedal 50' is shown at about half throttle opening position.

From the foregoing arrangement it will be apparent that the dashpot L is automatically operative when there is danger of engine stalling and when it does not slow up the transmission coast speed change and free-wheeling elimination which operate only above the critical speed of governor J. However as soon as governor J acts to open switch 94, then the dashpot L is rendered ineffective and the step-up in drive incident to clutching movement of sleeve F and the elimination of free-wheeling is expedited without interference by the dashpot L. Also at the higher speeds the engine is used more efficiently as a brake, by reason of the elimination of the dashpot action because when the accelerator pedal is released for coasting against the engine, the throttle valve immediately closes.

One important feature in the operation of my throttle control relates to the arrangement whereby the dashpot action is selectively rendered operative and ineffective substantially instantaneously in response to energization and de-energization of the electromagnet. In my control arrangement I do not rely on moving the piston 126 downwardly on its retarding stroke and holding it down in order to render the dashpot ineffective because with such arrangement it may be possible for the accelerator pedal to be released so suddenly that lever 140 encounters the full or partial resistance of the dashpot before the piston can be depressed owing to the inertia of the moving dashpot parts and the delay in moving the piston downwardly because of the fluid restriction. With my arrangement, incorporating the by-pass vent 142 and valve 143, the time required to control dashpot L is so small that it will function as desired under all conditions. In order to illustrate one condition in the operation of the transmission control system wherein my dashpot control provides the aforesaid advantageous action let it be assumed, for example, that the car is travelling in third with the accelerator pedal 50' fully depressed to close the kick-down switch 110 and that the car is travelling at a speed causing the governor switch 94 to remain open. Under these conditions the electromagnet M will be energized as in Fig. 12 and dashpot piston 126 will be raised by spring 141 ready for a downward retarding stroke. The reason that the electromagnet is energized under this condition is because the governor switch 94 and the kick-down switch 110 form parallel circuits embodying the electromagnet M such that, with governor switch 94 open, the conductor 151 is now grounded at 109 by way of conductor 111 and switch 110 instead of at 96 through the governor switch. Now let it be assumed, in the foregoing example, that the driver suddenly releases the accelerator pedal. Under such conditions it is desirable to let the engine slow down as rapidly as possible to synchronize teeth 49 with sleeve F to allow the latter to clutch with these teeth and step-up the transmission ratio from the assumed third to fourth, thereby eliminating the overrunning action at clutch E, coupling the engine with the vehicle driving wheels for braking the car by the engine, and obtaining a rapid speed ratio change. With my arrangement these desirable characteristics are obtained because during the first part of the accelerator pedal release movement, the switch 110 is opened thereby de-energizing the electromagnet M and allowing spring 149 to move valve 143 outwardly so that by the time lever 140 engages shoulder 138, piston 126 may then be moved downwardly without any dashpot retarding action. The initial releasing movement of the accelerator pedal thus serves to vent the dashpot working chamber 130. If the piston 126 had to be lowered and held in such position, instead of employing the by-pass 142, as a means of rendering the dashpot ineffective then the lever 140 would tend to catch-up to such downward piston movement and encounter undesirable retarding action under the circumstances outlined in the foregoing example.

I claim:

1. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, and means operable to vent said chamber so as to render said dashpot means ineffective to retard the last part of the throttle closing movement.

2. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, and electromagnetically controlled means operable to vent said chamber so as to render said dashpot means ineffective to retard the last part of the throttle closing movement.

3. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, and valving means for said chamber operable from a closed position accommodating said throttle retarding operation of said dashpot means to an open position thereby to vent said chamber and render said dashpot means ineffective to retard said throttle closing movement.

4. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, valving means for said chamber operable from a closed position accommodating said throttle retarding operation of said dashpot means to an open position thereby to vent said chamber and render said dashpot means ineffective to retard said throttle closing movement, and electromagnetically controlled means for operating said valving means from one of its said positions to the other.

5. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, valving means for said chamber operable from a closed position accommodating said throttle retarding operation of said dashpot means to an open position thereby to vent said chamber and render said dashpot means ineffective to retard said throttle closing movement, and electromagnetically controlled means for operating said valving means from its said open position to its said closed position.

6. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, means operable to vent said chamber so as to render said dashpot means ineffective to retard the last part of the throttle closing movement, governor means, means for operating said governor means, and means for controlling operation of said vent means in response to operation of said governor means.

7. In combination with an engine having a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, electromagnetically controlled means operable to vent said chamber so as to render said dashpot means ineffective to retard the last part of the throttle closing movement, governor means, means for operating said governor means, and means for controlling energization of said electromagnet in response to operation of said governor means.

8. In combination with an engine having a throttle adapted for opening and closing movements; dashpot means operable to retard only the last part of the throttle closing movement, said dashpot means comprising a fluid reservoir, a pressure fluid chamber, and a movable dashpot element cooperably associated with said chambers; a fluid by-pass between said chambers; and valving means for said by-pass operable from a first position closing said by-pass so as to accommodate said throttle retarding operation of said dashpot means to a second position opening said by-pass thereby to render said dashpot means ineffective to retard said throttle closing movement.

9. In combination with an engine having a throttle adapted for opening and closing movements; dashpot means operable to retard only the last part of the throttle closing movement, said dashpot means comprising a fluid reservoir, a pressure fluid chamber, and a movable dashpot element cooperably associated with said chambers, a fluid by-pass between said chambers; and valving means for said by-pass operable from a first position closing said by-pass so as to accommodate said throttle retarding operation of said dashpot means to a second position opening said by-pass thereby to render said dashpot means ineffective to retard said throttle closing movement; and electromagnetically controlled means for operating said valving means from one of its said positions to the other.

10. In combination with an engine having a throttle adapted for opening and closing movements; dashpot means operable to retard only the last part of the throttle closing movement, said dashpot means comprising a fluid reservoir, a pressure fluid chamber, and a movable dashpot element cooperably associated with said chambers; a fluid by-pass between said chambers; valving means for said by-pass operable from a first position closing said by-pass so as to accommodate said throttle retarding operation of said dashpot means to a second position opening said by-pass thereby to render said dashpot means ineffective to retard said throttle closing movement; governor means; means for operating said governor means; and means for controlling operation of said valving means in response to operation of said governor means.

11. In combination with an engine having a throttle adapted for opening and closing movements; dashpot means operable to retard only the last part of the throttle closing movement, said dashpot means comprising a fluid reservoir, a pressure fluid chamber, and a movable dashpot element cooperably associated with said chambers; a fluid by-pass between said chambers; valving means for said by-pass operable from a first position closing said by-pass so as to accommodate said throttle retarding operation of said dashpot means to a second position opening said by-pass thereby to render said dashpot means ineffective to retard said throttle closing movement; electromagnetically controlled means for operating said valving means from one of its said positions to the other; governor means; means for operating said governor means; and means for controlling energization of said electromagnet in response to operation of said governor means.

12. In a motor vehicle drive comprising an engine having a throttle adapted for opening and closing movements, an accelerator pedal operably connected to said throttle and adapted to be depressed by the vehicle driver to effect said throttle opening movement, dashpot means operable to retard only the last part of the throttle closing movement as an incident to release of the accelerator pedal by the vehicle driver, said dashpot means comprising a movable dashpot element and a pressure-fluid-receiving chamber cooperably associated with said element for retarding movement thereof, and means operable to vent said chamber in response to release of said accelerator pedal from approximately fully depressed position thereof thereby to render said dashpot means ineffective to retard the last part of the throttle closing movement.

13. In a motor vehicle drive comprising an engine having a throttle adapted for opening and closing movements, an accelerator pedal operably connected to said throttle and adapted to be depressed by the vehicle driver to effect said throttle opening movement, dashpot means operable to retard only the last part of the throttle closing movement as an incident to release of the accelerator pedal by the vehicle driver, said dashpot means comprising a movable dashpot element and a pressure-fluid-receiving chamber cooperably associated with said element for retarding movement thereof, electromagnetically controlled means operable to vent said chamber, and means for controlling energization of said electromagnet in response to release of said accelerator pedal from approximately fully depressed position thereof thereby to render said dashpot means ineffective to retard the last part of the throttle closing movement.

14. In a motor vehicle drive comprising an engine having a throttle adapted for opening and closing movements, an accelerator pedal operably connected to said throttle and adapted to be depressed by the vehicle driver to effect said throttle opening movement, dashpot means operable to retard only the last part of the throttle closing movement as an incident to release of the accelerator pedal by the vehicle driver, said dashpot means comprising a movable dashpot element and a pressure-fluid-receiving chamber cooperably associated with said element for retarding movement thereof, and means operable to vent said chamber in response to movement of said accelerator pedal thereby to render said dashpot means ineffective to retard the last part of the throttle closing movement.

15. In a drive for a motor vehicle having an engine provided with a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, means operable to vent said chamber, a variable speed ratio transmission comprising means operable to effect change in the speed ratio drive between the engine and vehicle, change-speed control means operable to control operation of said speed ratio change means, and means operable under control of said change-speed control means for operating said vent means to selectively render the dashpot means either operable as aforesaid or ineffective to retard the last part of the throttle closing movement.

16. In a drive for a motor vehicle having an engine provided with a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, means operable to vent said chamber, a variable speed ratio transmission comprising means operable to effect change in the speed ratio drive between the engine and vehicle, change-speed control means operable in response to predetermined speed of travel of the vehicle to control operation of said speed ratio change means, and means operable under control of said change-speed control means for operating said vent means to selectively render the dashpot means either operable as aforesaid or ineffective to retard the last part of the throttle closing movement.

17. In a motor vehicle drive comprising an engine having a throttle adapted for opening and closing movements, an accelerator pedal operably connected to said throttle and adapted to be depressed by the vehicle driver to effect said throttle opening movement, dashpot means operable to retard only the last part of the throttle closing movement as an incident to release of the accelerator pedal by the vehicle driver, said dashpot means comprising a movable dashpot element and a pressure-fluid-receiving chamber cooperably associated with said element for retarding movement thereof, electromagnetically controlled means operable to vent said chamber, a pair of parallelly arranged electrical circuits each adapted to control energization of said electromagnet, means responsive to movement of the accelerator pedal for controlling one of said circuits, and means responsive to predetermined speed of travel of the vehicle for controlling the other of said circuits.

18. In a motor vehicle drive comprising an engine having a throttle adapted for opening and closing movements, an accelerator pedal operably connected to said throttle and adapted to be depressed by the vehicle driver to effect said throttle opening movement, dashpot means operable to retard only the last part of the throttle closing movement as an incident to release of the accelerator pedal by the vehicle driver, said dashpot means comprising a movable dashpot element and a pressure-fluid-receiving chamber cooperably associated with said element for retarding movement thereof, means operable to vent said chamber, means responsive to movement of the accelerator pedal for controlling operation of said vent means, and means responsive to predetermined speed of travel of the vehicle for controlling operation of said vent means.

19. In a drive for a motor vehicle having an engine provided with a throttle adapted for opening and closing movements, dashpot means operable to retard only the last part of the throttle closing movement, said dashpot means comprising a movable dashpot element and a pressure-fluid-receiving chamber cooperably associated with said element for retarding movement thereof, means operable to vent said chamber, a variable speed ratio transmission comprising means operable to effect step-up change in the speed ratio drive between the engine and vehicle when the engine speed is retarded while the vehicle is travelling at or above a predetermined speed, change-speed control means operable to control operation of said speed ratio change means in response to predetermined speed of travel of the vehicle, and means operable under control of said change-speed control means for effecting operation of said vent means thereby to render said dashpot means ineffective to retard the last part of the throttle closing movement when the vehicle attains the aforesaid predetermined speed.

VICTOR E. MATULAITIS.